No. 718,940. PATENTED JAN. 20, 1903.
G. W. WHITTINGTON.
MACHINE FOR MAKING WIRE ARTICLES.
APPLICATION FILED JULY 5, 1902.
NO MODEL. 5 SHEETS—SHEET 1.

Fig. 1.

WITNESSES:
W. L. Bushong.
Nellie Allemong.

INVENTOR
George W. Whittington
BY
V. H. Lockwood
ATTORNEY

No. 718,940. PATENTED JAN. 20, 1903.
G. W. WHITTINGTON.
MACHINE FOR MAKING WIRE ARTICLES.
APPLICATION FILED JULY 5, 1902.
NO MODEL. 5 SHEETS—SHEET 3.

WITNESSES:
W. L. Bushong.
Nellie Allemong.

INVENTOR
George W. Whittington
BY
V. H. Lockwood
ATTORNEY

No. 718,940. PATENTED JAN. 20, 1903.
G. W. WHITTINGTON.
MACHINE FOR MAKING WIRE ARTICLES.
APPLICATION FILED JULY 5, 1902.
NO MODEL. 5 SHEETS—SHEET 4.

WITNESSES: INVENTOR
George W. Whittington
BY
Attorney

No. 718,940. PATENTED JAN. 20, 1903.
G. W. WHITTINGTON.
MACHINE FOR MAKING WIRE ARTICLES.
APPLICATION FILED JULY 5, 1902.
NO MODEL. 5 SHEETS—SHEET 5.

WITNESSES:
W. L. Bushong.
Nellie Allimong.

INVENTOR
George W. Whittington
BY
V. H. Lockwood
ATTORNEY

UNITED STATES PATENT OFFICE.

GEORGE W. WHITTINGTON, OF INDIANAPOLIS, INDIANA.

MACHINE FOR MAKING WIRE ARTICLES.

SPECIFICATION forming part of Letters Patent No. 718,940, dated January 20, 1903.

Application filed July 5, 1902. Serial No. 114,386. (No model.)

*To all whom it may concern:*

Be it known that I, GEORGE W. WHITTINGTON, of Indianapolis, county of Marion, and State of Indiana, have invented a certain new and useful Machine for Making Wire Articles; and I do hereby declare that the following is a full, clear, and exact description thereof, reference being had to the accompanying drawings, in which like characters refer to like parts.

This invention relates to a machine for making wire articles that require one or more coils in them.

The machine herein shown and described specifically is especially designed for the manufacture of wire clothes-pins of the kind embraced in my invention explained in my application for Letters Patent filed October 2, 1899, Serial No. 732,390.

The full nature of my invention will be understood from the accompanying drawings and the description following of one form of device embodying my said invention; and the scope of the invention will be understood from the claims following said description.

Figure 4:
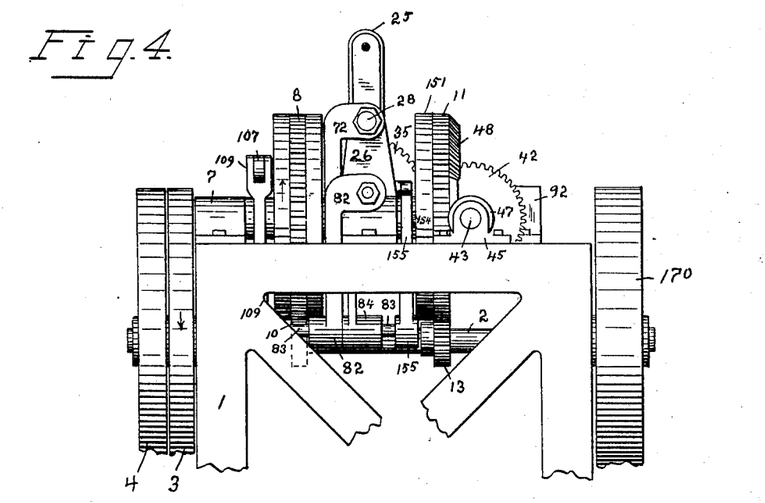
Fig. 4 is a rear elevation of said machine, with the lower part of the framework and driving-wheels broken away and the rear wire-support removed.
Figure 5:
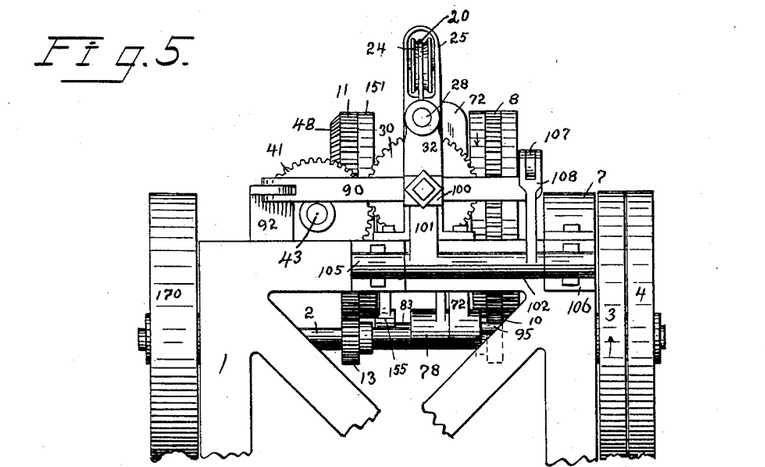
Fig. 5 is a front view of the same.

In detail let 1 represent the framework of the machine, which may be made in any suitable form for its support. In said framework I mount horizontally the driving-shaft 2, driven by the driving-wheel 3, that is rigidly secured to said shaft. An idler 4 is loosely mounted on said shaft beside the driving-wheel 3. Said shaft 2 is mounted in the bearings 5, to be seen in Figs. 2 and 3. The driving-wheel 3 may be driven from any suitable source of power. 170 is a fly-wheel on shaft 2. Above said main shaft 2 an auxiliary shaft 6 is mounted in the bearings 7, one of said bearings 7 being on the side top part of the frame and the other on the central top part thereof. On the auxiliary shaft 6 a main driving-gear 8 is secured, 9 being the hubs thereof. This main driving-gear consists centrally of a spur-gear portion that engages with and is driven by the pinion 10 on the main shaft 2, as appears in Figs. 2, 4, and 5. On the same shaft 2 I secure a secondary driving-gear 11, having the hub 12, and drive it from the pinion 13, to be seen in Figs. 3, 4, and 5.

Figure 6:
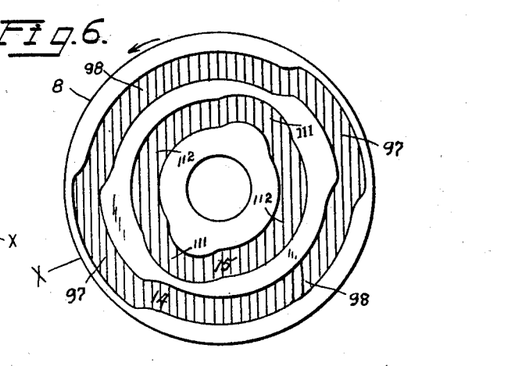
Fig. 6 is an elevation of the left side of the main driving-gear.

Returning now to the main driving-gear 8, its sides are provided with cam-grooves, the right side thereof having the outer cam-groove 14 and the inner cam-groove 15, as appears in Fig. 6. The left side of said gear 8 has the outer cam-groove 16 and the inner one 17.

Figure 1:
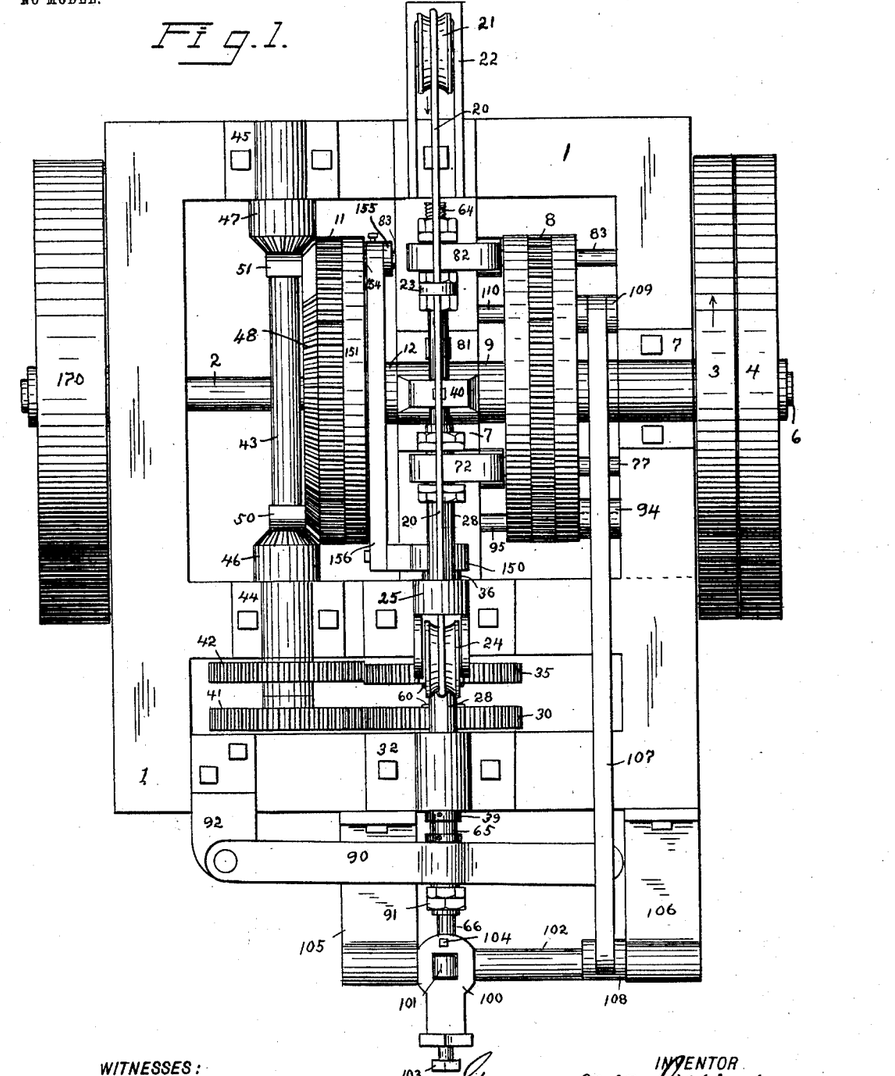
Figure 1 is a plan view of my new machine.
Figure 2:
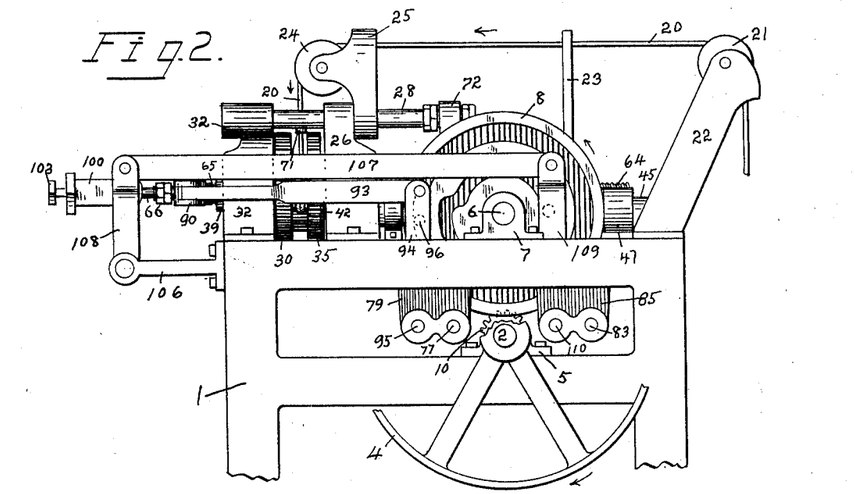
Fig. 2 is an elevation of the right side of said machine, the lower part of the framework being broken away and also a part of the drive-wheels.
Figure 3:
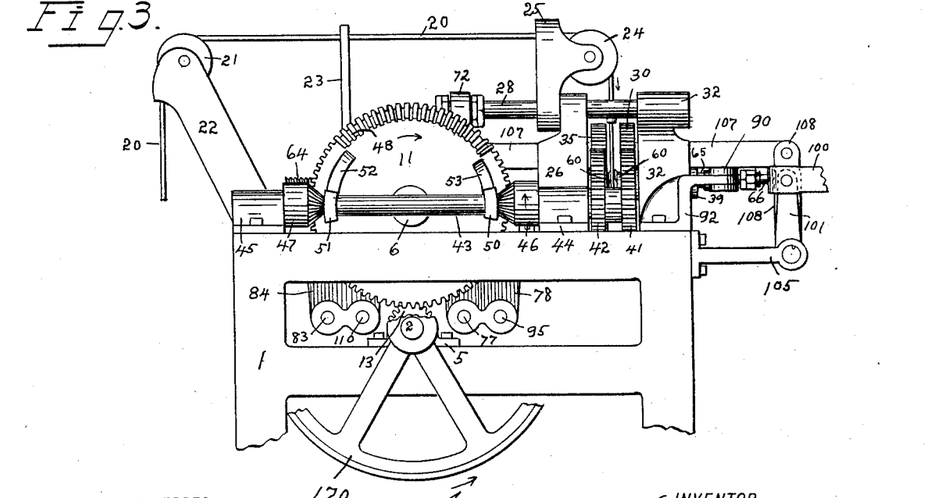
Fig. 3 is an elevation of the left side thereof, with the lower part of the framework broken away.
Figures 8, 9, 10, 11:
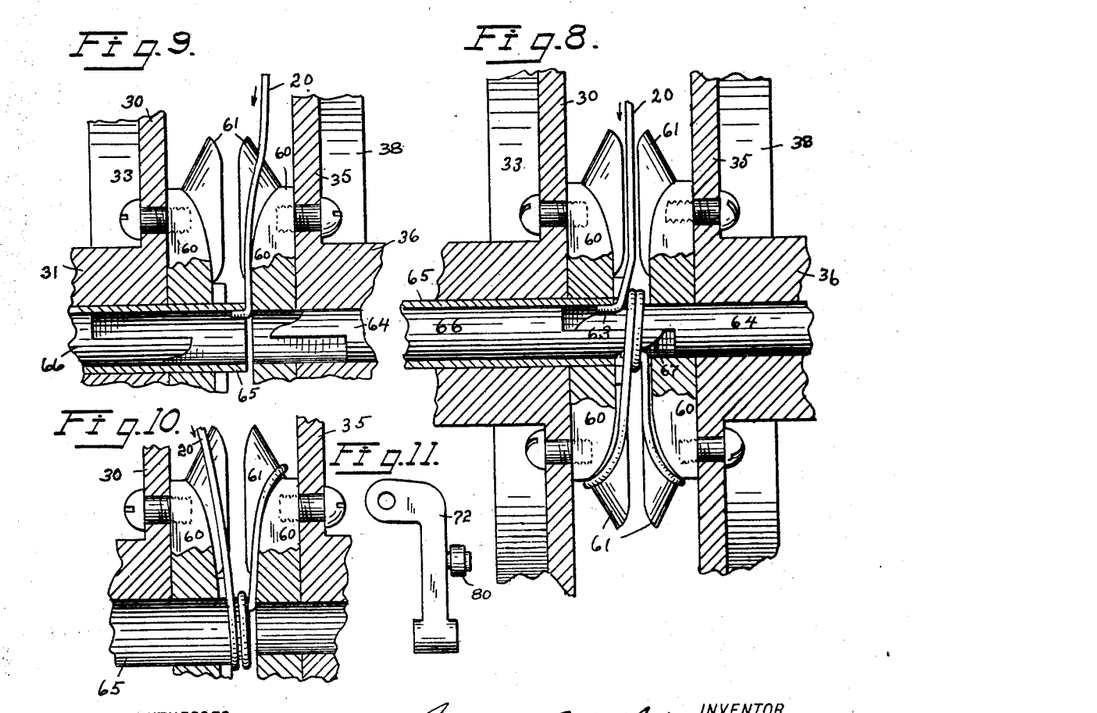
Fig. 8 is a central vertical section through the coiler and its connecting parts.
Fig. 9 is a detail of a part of Fig. 8 in a later stage of the operation.
Fig. 10 is a detail of a part of Fig. 8 in a later stage of the operation than that shown in Fig. 9.
Fig. 11 is an elevation of one of the levers that is actuated by the cam-grooves in the driving-gear.

From any suitable reel or other source of supply a strand of wire 20 is drawn over the sheave-wheel 21, mounted on the arm 22, extending upward at an angle from the rear of the machine, as appears in Figs. 2 and 3, and through a guide-arm 23 and another sheave-wheel 24 on the support 25, that is secured to the bearing-block 26, which is fastened to one of the cross-bars of the frame. From said sheave-wheel 24 the wire extends downward, as appears in Figs. 2 and 3, to the coiling device through a hole in the rod 28, having the tube 71. The coiling device, which appears enlarged in Fig. 8, consists of the spur-wheel 30, whose hub 31 is mounted in the bearing 32, as appears in Fig. 1, and extends forward for considerable distance through the collar 39 for holding the wheel 30 in position. Said gear has a rim-flange 33, as seen in Fig. 8, to widen its periphery, on which the teeth of the gear are located. There is a companion gear-wheel 35 located opposite and in the rear of the gear 30, whose hub 36 is mounted in the bearing 25 and extends rearward within the collar 150. Said gear is likewise provided with a wide peripheral flange 38. Said wheels 30 and 35 are driven by the gears 41 and 42, respectively, that are secured on the shaft 43, which is longitudinally mounted on the framework in the bearings 44 and 45. Said shaft is intermittently rotated in opposite directions by the bevel-gears 46 and 47, that are carried thereon, and a segmental bevel-gear 48 on the left side of the auxiliary driving-gear 11, as appears in Figs. 1 and 3. Both of the bevel-pinions 46 and 47 are rigidly secured on the shaft 43; but only one is actuated at a time. The bevel segmental gear 48 first engages the pinion 46 and rotates it, together with the shaft 43, in the direction indicated by the arrow in Fig. 3. When said segmental gear engages the other bevel-gear 47, it and the shaft 43 are rotated in the opposite direction, as indicated by the arrow in Fig. 3. Therefore each rotation of the auxiliary driving-gear 11 causes the coiling-gears 30 and 35 to rotate temporarily first in one direction and then in the opposite direction. To hold said shaft 43 from rotation while there is no engagement between the segmental gear 48 and the bevel-gears 46 and 47, the blocks 50 and 51 are rigidly secured thereon and have flat inner faces that engage the extensions 52 and 53 on the side of the auxiliary driving-gear 11, as appears in Fig. 3. The engagement between these blocks 50 and 51 and extensions 52 and 53 continues only while there is no engagement between the segmental gear 48 and either of the bevel-gears 46 or 47. The opposing faces of the coiling-gears 30 and 35 have secured to them a pair of coiling-irons 60. The coiling-iron is provided at its two opposite ends with the looping-points 61, that engage the strand of wire and not only hold it while it is being coiled, but also bend the end of the wire article when formed in opposite directions, as appears at the lower side of Fig. 8. When the wire is introduced into the coiling apparatus, its end is caught and held, as shown at 63 in Fig. 8, between the longitudinally-moving knife 64 on one side and the sleeve 65 on the other. In other words, the end of the wire is pinched between these two points. The knives 64 and 66 are then withdrawn by a means hereinafter to be explained, so that their ends disengage, and the article formed, as appears in Fig. 8, is discharged by the longitudinal movement of the coiler 35. Then the sleeve 65 is moved to the right, by means hereinafter to be explained, until it pinches the end of the wire against the right coiling-iron 60, as seen in Fig. 9. The coiling gears and irons are then rotated, the coil being formed around the sleeve 65. When the rotation begins, by means hereinafter to be described the wire is thrown over the right looping-points 61, as appears in Fig. 9. As the rotation proceeds the wire is caught about said points, as shown in the lower part of Fig. 8, so that it is not only held, but is curved outward at the end by reason of the curved face of the coiling-iron 60. During the coiling the wire is held centrally, as shown in the upper part of Fig. 8, until the last half-revolution, when it is thrown to the left over the left looping-point, so that when it is turned down it is in the position shown in Fig. 8. Before this last step in the operation is performed by the means to be hereinafter described the sleeve 65 is withdrawn, leaving the space between the ends of the two knives open, during which time the wire extends centrally across the pathway of the two knives. Then the two knives 64 and 66 move toward each other, severing the wire, and the further movement of the knife 66 by reason of its bevel-point 67 bends the end inside the coil opposite the other end, (shown in Fig. 8,) but otherwise exactly like it. In other words, at that stage of the operation both sides of the coiling device will appear as the side shown in Fig. 8. When the wire is severed, as shown in Fig. 10, the end of the strand is again caught, as shown at 63 in Fig. 8, and held until the knives can separate, and the device formed is discharged, and the sleeve 65 pushes the end of the strand of wire against the right coiling-iron, as appears in Fig. 9. This operation is rapid, and at each repetition of it an article is formed and discharged automatically.

Figure 7:
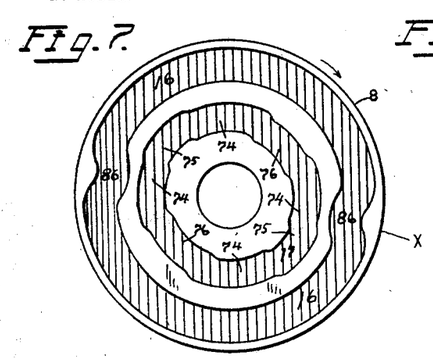
Fig. 7 is an elevation of the right side thereof.

The mechanism for predetermining the movements of the parts of the coiling device is governed by the cam-grooves in the sides of the main driving-gear 8, as appears in Figs. 6 and 7. The connecting mechanism between these two parts will now be explained.

The wire is thrown to the left or right, as required, by the sliding rod 28 (shown in Fig. 2) through the tube 71, in which the wire passes. The rod 28 is reciprocated through the bearings 26 and 32 by means of the lever 72, fulcrumed at its lower end on the shaft 77, (shown in Figs. 1 and 3,) that has one end mounted in the hanging box 78 and the other end in the hanging box 79. The hanging box 78 (shown in Fig. 3) is secured to the middle longitudinal top piece of the frame, while the box 79 is secured on the under side of the left top piece of the frame. Said lever is shown in side elevation in Fig. 11. The roller 80 on said lever operates in the groove 17. (Seen in Fig. 7.) The lever 72 is adjustably held by nuts on each side of it on the rod 28, as seen in Figs. 1 and 3. Said groove 17 is so formed as to cause the bar 28 to move at the time and to the extent desired in order to throw the wire over the left or the right looping-points, as above explained. The roller 80 on the arm 72 passes through the parts of the groove 17 marked 74 while in its middle position and while holding the wire in its central position, as shown in Fig. 8. It passes through the portions of the grooves marked 75 when the rod 28 and wire in the coiling device are pushed to the right, as shown in Fig. 9. It passes through the parts marked 76 when the bar and wire are moved in the opposite direction, or to the left. Therefore during each revolution of the driving-gear 8 said rod 28 and the wire are pushed to the left twice and to the right twice and two of the wire articles are formed.

The reciprocating knife 64 is driven by the groove 16 in the wheel 8 through the following means: The reciprocating knife 64 extends rearward from the coiling mechanism through the box 26 (see Fig. 2) and the sliding block 40 on the bearing 81. It is reciprocated by the lever 82, which is secured to it by nuts, and said lever is fulcrumed at its lower end on the shaft 83, (seen in Figs. 1, 2, and 3,) that has a bearing at one end in the box 84, mounted on the under side of the central top piece of the frame, and the other end of said shaft is carried in the box 85, secured on the under side of the left top piece of the frame. These features are shown in Figs. 2 and 3. Said lever has a roller, (not shown,) like the roller 80 on the lever 72, however, that operates in the groove 16 in the left side of the wheel 8. Said groove, it is observed, is concentric, excepting in two portions at 86 diametrically opposite each other. Therefore each revolution of the wheel 8 causes a quick temporary forward and backward movement of said knife-rod 64. In such movement said knife cuts and holds the wire.

The sleeve 65, which extends forward from the coiling mechanism through the hub of gear 30 within the bearing 32, is horizontal and is pivotally connected to the cross-lever 90 by means of the nuts 91 on each side of the connection, as shown in Fig. 1. The lever 90 is pivoted at one end to the stationary plate 92 and at the other end to the connecting-rod 93. (Seen in Fig. 2.) Said rod is pivoted to the upper end of the lever 94, which is fulcrumed at its lower end to the shaft 95, having a bearing at one end in the box 79 and at the other end in the box 78. (Shown in Figs. 2 and 3.) Said lever 94 has a roller 96, (seen in dotted lines, Fig. 2,) that operates in the outer groove 14 on the right side of the driving-gear 8. Said groove is composed of four parts. The oppositely-located parts 97 propel the connecting-rod 93 forward, and thus move said sleeve forward or to the left into the position shown in Fig. 8. The other opposite portions 98 of said groove cause a return movement of the connecting-rod 93, which forces said sleeve rearward or to the right, as shown in Fig. 9.

The reciprocating knife-rod 66 extends forward from the coiling mechanism through the sleeve 65 and the adjusting-plate 100 and arm 101 from the shaft 102, as appears in Figs. 1, 2, and 3. Said plate 100 is provided with set-screws 103 at the end and 104 on top for adjusting the position of the knife-rod. The shaft 102 is mounted in the bearing-brackets 105 and 106, connected to the front end of the framework. The oscillation of said shaft 102 causes the reciprocation of the knife-rod 66. This oscillation is caused by the bar 107, which is pivoted at the front end to the arms 108, secured on the shaft 102, and at the other end to the lever 109, which at its lower end is fulcrumed to the shaft 110, that at one end is mounted in the box 85, as appears in Fig. 2, and at the other end in the box 84, as appears in Fig. 3. Said lever is provided with a roller extending inward horizontally from the inner surface of the lever 109 (shown in dotted lines in Fig. 2) and which operates in the groove 15 in the left face of the driving-gear 8. Said groove is provided with four sections, the oppositely-located sections 111 tending to propel all the parts mentioned rearward and the oppositely-located sections 112 tending to move said parts forward.

Figures 12, 13, 14:
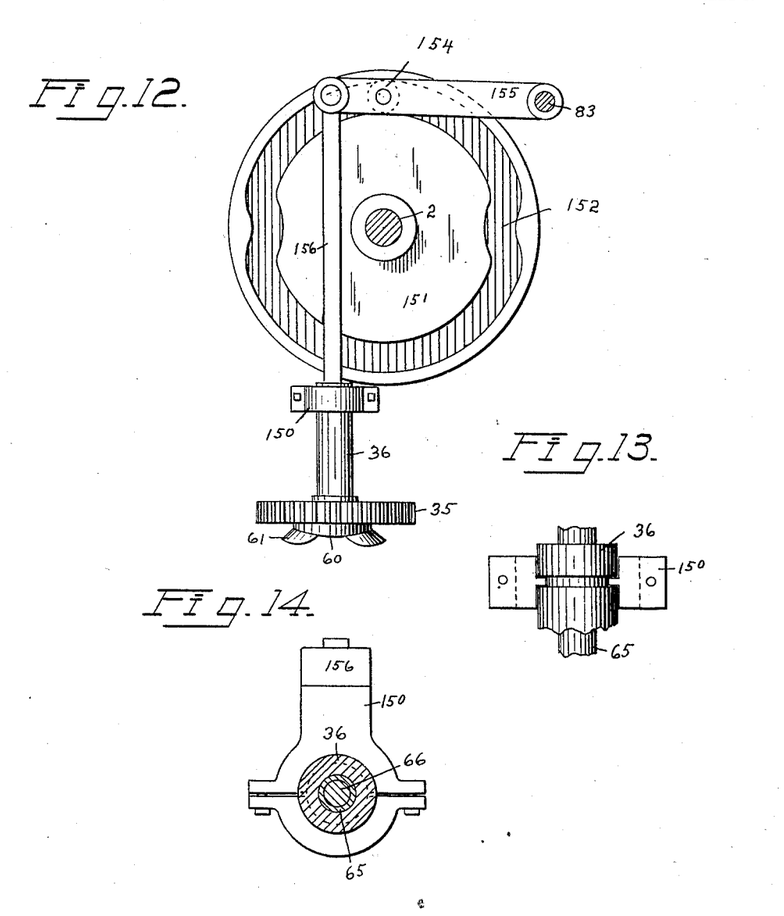
Fig. 12 is an inside elevation of the means for moving and controlling one coiling-wheel.
Figs. 13 and 14 are details of the connection between the collar and shaft shown in Fig. 12, the latter showing the shaft in section.

The inner coiler 35 is controlled and moved toward and away from the companion coiler 30 by the mechanism shown in Figs. 12, 13, and 14. A cam-wheel 151 is mounted on the shaft 2 beside the gear 11, and its inner face is provided with the cam-groove 152, (shown in Fig. 12,) in which the roller 154 (shown in dotted lines in Fig. 12) operates, said roller being mounted on the lever 155, which at one end is pivoted to the rod 83 and at the other end pivoted to the connecting-rod 156, having on its free end the collar 152, which is secured or clamped on the hub 36 and the coiler-wheel 35. The groove 150 in the cam-wheel has two curvatures in it diametrically opposite each other, whereby the roller 154 is moved inward and then outward into the main path or groove, that causes the coiler-wheel 35 to more closely approach the wheel 30 in the latter part of the operation, as shown in Fig. 10. During the preceding part of the operation the main portion of the groove 152 and the cam-wheel 151 causes the wheels 35 and 30 to be considerably separated, as appears in Figs. 8 and 9. The movement of the two wheels 30 and 35 together, as shown in Fig. 10, is momentary while the second loop is being formed and the wire cut, and then the cam-wheel 151 causes the coiler 35 to be quickly moved away from the coiler 30, and in that movement the clothes-pin is discharged by the mere separation of said wheels. The knives 64 and 66 are separated before the pin is so nearly completed, as shown in Fig. 10, so that when the two wheels move apart the knives do not hold the coil of the clothes-pin, and there being nothing to hold it it drops down in completed form. The purpose of the movement of the rearward coiler 35 is to discharge the wire article when finished.

The sequence of the various movements of the various parts just described—namely, the wire-throwing device, the two knife-rods, the sleeve 65, and the discharging movement of coiler 35—is established by the relative arrangement of the grooves in the two sides of the driving-gear and in disk 151. The point marked X on the left side of the wheel 8, as shown in Fig. 6, is opposite the point marked X on the right side, as shown in Fig. 7. The further movement of the wheel 8 from the position shown in Figs. 6 and 7 causes the roller 96, whereby the sleeve 65 is actuated, to pass from the portion 97 of the groove 14 inward in the portion 98, that forces said sleeve to the rearward or to the right into the position shown in Fig. 9. This movement of the wheel 8 would cause the roller on the lever 109, which actuates the knife 66, to move forward, which would move the knife forward, or to the left as shown in Fig. 8. At the same time the roller of the lever 82, that actuates the knife 64, would be held rearward, which would hold the knife 64 rearward, or in the position shown in Fig. 9. At the same time the roller 73, that actuates the wire-throwing device, is moving into the portion 76 of the groove 17, which quickly jerks the rod 28 rearward, so as to throw the wire over the rear looping-point 61—that is, the upper one to the left as seen in Fig. 8—and places the wire in the position shown in Fig. 9. The further movement of said wheel 8 will cause the wire-throwing device to return to its unoperated position as the roller 80 runs into the portion 74 of the groove 17. Further movement of said wheel does not change the position of these parts for some time, during which time the coil is being made, two rotations occurring in the machine, as here shown. Then the roller 80, that actuates the wire-throwing device, enters the section 75 of the groove 17, which forces the rod 28 to the front, and thereby forces the wire over the upper front wire-looping point 61—that is, the one to the left in Fig. 8. The further movement of said wheel will cause the roller 96, that actuates the sleeve 65, to enter section 97 of the groove 14, that forces said sleeve forward from the position shown in Fig. 9 to that shown in Fig. 8. This leaves the center of the coiling mechanism free during the further rotation, which brings the strand of wire across the center. Then the further rotation of the wheel 8 brings the rollers that actuate the knives 64 and 66 into the section 86 of the groove 16 and the section 111 of the groove 15, respectively. This forces the knives together from the position shown in Fig. 9 to that shown in Fig. 8 and cuts off the wire. The back of the knife 64 bends the end 63 of the main strand of the wire in one direction, and the knife 66 bends the other cut end of the wire in the opposite direction, as shown in Fig. 8. The article being now completed, the further movement of the gear 8 separates the knives, and the movement of the coiler 35 rearward by the disk 151 causes the coilers to separate, whereupon the wire articles will be forced down and out by the spreading of the points 61 and their sloping or tapering surfaces, and the immediate return of the coiler 35 will put the parts in their original position. This represents the result of a half-revolution of the gear 8. The other half-revolution has the same effect, so that in each revolution two articles are made and discharged. Disk 151 and gear 8 being on the same shaft, the desired order of movement of the parts is easily secured.

What I claim as my invention, and desire to secure by Letters Patent, is—

1. In a machine for making wire articles, a rotatable coiling mechanism comprising means near the center thereof for holding the end of the wire that is to be operated upon, oppositely-located looping-points some distance away from the center, a removable means in the center about which the coil is formed as the coiling mechanism rotates, and a centrally-reciprocable knife for severing the wire after the article is formed.

2. In a machine for making wire articles, a rotatable coiling mechanism comprising means near the center thereof for holding the end of the wire to be operated upon, oppositely-located looping-points, means for throwing the wire first over one point and then over the other, a removable means in the center about which the coil is formed as the coiling mechanism rotates, and a centrally-reciprocable knife for severing the wire after the article is formed.

3. In a machine for making wire articles, a rotatable coiling mechanism comprising means near the center for holding the end of the wire to be operated upon, oppositely-located looping-points, a reciprocable guide for holding the wire in line, means for moving said reciprocable guide to throw said wire first over one looping-point and then over the other, a removable means in the center about which the coil is formed as the coiling mechanism rotates, and a centrally-reciprocable knife for severing the wire after the article is formed.

4. In a machine for making wire articles, a rotatable coiling mechanism comprising means near the center thereof for holding the end of the wire that is to be operated upon, oppositely-located looping-points some distance away from the center, a removable means in the center about which the coil is formed as the coiling mechanism rotates, centrally-reciprocable knives for severing the wire after the article is formed, and means for forcing the article out of said coiling mechanism when it is completed.

5. In a machine for making wire articles, a rotatable coiling mechanism comprising means near the center thereof for holding the end of the wire that is to be operated upon, oppositely-located looping-points some distance away from the center that are oppositely sloping or tapering, a removable means in the center about which the coil is formed as the coiling mechanism rotates, centrally-reciprocable knives for severing the wire after the article is formed, and means for separating said looping-points after the article has been made to force it out of the coiling mechanism.

6. In a machine for making wire articles, a pair of disks with opposing faces, means for rotating said disks in the same direction, a coiling-iron oppositely placed on each disk, a looping-point on each end of each coiling-iron, means near the center for holding the end of the wire to be treated, and means for throwing the wire over the looping-points as the disks are rotated.

7. In a machine for making wire articles, a pair of disks with opposing faces, means for rotating said disks in the same direction, the coiling-irons 60 oppositely placed on said disks, the looping-points 61 on said coiling-irons, the knife-rods 64 and 66 oppositely reciprocable centrally through said disks and coiling-irons, and the reciprocable sleeve 65 surrounding the knife-rod 66.

8. In a machine for making wire articles, a pair of disks with opposing faces, means for rotating said disks in the same direction, the coiling-irons 60 oppositely placed on said disks, the looping-points 61 on said coiling-irons, the knife-rods 64 and 66 oppositely reciprocable centrally through said disks and coiling-irons, the reciprocable sleeve 65 surrounding the knife-rod 66, and the reciprocable guide-rod 28 mounted above said disks, whereby the wire is looped over the looping-points 61.

9. In a machine for making wire articles, a pair of disks with opposing faces, coiling-irons oppositely placed on said disks, a looping-point on each end of each coiling-iron, a removable means in the center about which the coil is formed, a pair of gears that drive said disks, a shaft upon which said gears are secured that is provided with double bevel-pinions, and a segmental driving-gear that in its revolutions engages said pinions alternately and rotates said shaft first in one direction and then in the other.

10. In a machine for making wire articles, a pair of disks with opposing faces, coiling-irons oppositely placed on said disks, a looping-point on each end of each coiling-iron, a removable means in the center about which the coil is formed, the gears 41 and 42 that drive said disks, the shaft 43 on which said gears are secured, the oppositely-located bevel-pinions 46 and 47 on said shaft, the driving-gear 11 provided with segmental bevel-gears 48, and the bearing-blocks 50 and 51 that bear against the plain surface of said gear 11, substantially as set forth.

11. In a machine for making wire articles, a pair of rotatable coiling-irons, looping-points thereon, a sleeve reciprocable centrally through one of said coiling-irons and adapted to abut against the other coiling-iron, a knife-rod in said sleeve, an oppositely-located knife-rod whose end extends into the end of said sleeve with a shoulder thereon to abut against the end of said sleeve and hold the wire, a guide-rod through which the wire extends, a cam drive-wheel, connections between said cam-wheel and said sleeve, reciprocable knife-rods, a guide-rod for reciprocating them, the cam-surfaces on said cam-wheel being so arranged as simultaneously to separate the knife-rods and move the sleeve against the coiling-iron, then to reciprocate the guide-rod to cause the wire to be looped about the looping-points, then to withdraw said sleeve out of the coiled article, and then to move said knife-rods together to cut off the article after it is formed.

12. In a machine for making wire articles, a pair of rotatable coiling-irons, looping-points thereon, a sleeve reciprocable centrally through one of said coiling-irons and adapted to abut against the other coiling-iron, a knife-rod in said sleeve, an oppositely-located knife-rod whose end extends into the end of said sleeve with a shoulder thereon to abut against the end of said sleeve and hold the wire, a guide-rod through which the wire extends, a cam drive-wheel, and connections between said cam-wheel and said sleeve, reciprocable knife-rods, a guide-rod for reciprocating them, the cam-surfaces on said cam-wheel being so arranged as simultaneously to separate the knife-rods and move the sleeve against the coiling-iron, then to reciprocate the guide-rod to cause the wire to be looped about the looping-points, then to withdraw said sleeve out of the coiled article, then to move said knife-rods together to cut off the article after it is formed, and means for separating the coiling-irons after the article is cut off for discharging it.

13. In a machine for making wire articles, a pair of coiling-irons, looping-points thereon, a pair of knife-rods centrally reciprocable through said coiling-irons, a reciprocable sleeve surrounding one of said knife-rods, a cam drive-wheel with grooves in its faces, a lever pivoted at one end to said knife-rods and fulcrumed at the other end, a roller on said lever operating in one of the grooves in the cam-wheel, a cross-lever connected with said sleeve for actuating it fulcrumed at one end, a bar pivoted to the other end of said lever, a lever fulcrumed at one end and pivoted at the other end to said bar, a roller on said lever that operates in another groove in said cam-wheel, an oscillatory rod, an arm on said rod adjustably connected with one of said knife-rods for actuating it, another arm on said oscillatory rod, a bar pivoted at one end to said arm, a lever fulcrumed at one end and at the other end pivoted to said bar, a roller on said lever operating in another groove of said cam-wheel, the grooves in said cam-wheel being so formed in relation to each other as to cause the sleeve to first catch the wire between it and one of the coiling-irons and to remove the knife-rods from each other, then to withdraw the sleeve out of the coiled article, and then to bring the knife-rods together to cut the article free.

14. In a machine for making wire articles, the coilers 30 and 35, the latter having a rearwardly-extending hub 36 that is longitudinally movable, the arm 150 secured to said coiler-hub, the rod 156 pivoted to said arm, the lever 155 pivoted to said rod and having a roller on one side of it, and the wheel 151 with the cam-groove therein, substantially as shown.

In witness whereof I have hereunto affixed my signature in the presence of the witnesses herein named.

GEORGE W. WHITTINGTON.

Witnesses:
V. H. LOCKWOOD,
NELLIE ALLEMONG.